(12) United States Patent
Wiget

(10) Patent No.: US 9,505,049 B2
(45) Date of Patent: Nov. 29, 2016

(54) SERVO MOTOR CONTROLLED HYDRAULIC PUMP UNIT FOR TUBE END FORMING EQUIPMENT

(71) Applicant: AddisonMckee Inc., Lebanon, OH (US)

(72) Inventor: John Fredrick Wiget, Wilmington, OH (US)

(73) Assignee: ADDISONMCKEE INC., Lebanon, OH (US)

( * ) Notice: Subject to any disclaimer, the term of this patent is extended or adjusted under 35 U.S.C. 154(b) by 950 days.

(21) Appl. No.: 13/670,722

(22) Filed: Nov. 7, 2012

(65) Prior Publication Data

US 2013/0305803 A1    Nov. 21, 2013

Related U.S. Application Data

(60) Provisional application No. 61/558,980, filed on Nov. 11, 2011.

(51) Int. Cl.
| | |
|---|---|
| *B21D 41/00* | (2006.01) |
| *B21C 19/00* | (2006.01) |
| *B29C 57/04* | (2006.01) |

(Continued)

(52) U.S. Cl.
CPC ........... *B21D 41/00* (2013.01); *B21D 19/00* (2013.01); *B21D 41/021* (2013.01); *B29C 57/04* (2013.01)

(58) Field of Classification Search
CPC ...... B21D 39/08; B21D 41/02; B21D 41/00; B21D 41/021; B21D 41/026; B21D 19/00; B28C 57/02; B28C 57/04
See application file for complete search history.

(56) References Cited

U.S. PATENT DOCUMENTS

| | | |
|---|---|---|
| 2,543,480 A | 2/1951 | Vaill |
| 3,959,998 A | 6/1976 | Ross |
| 4,088,008 A * | 5/1978 | Whatling ............... B21D 41/02 279/76 |

(Continued)

FOREIGN PATENT DOCUMENTS

| | | |
|---|---|---|
| CN | 201027714 Y | 2/2008 |
| CN | 201788395 | 4/2011 |

(Continued)

OTHER PUBLICATIONS

PCT/US2012/063937, International Search Report, mailed Mar. 21, 2013.

(Continued)

*Primary Examiner* — Moshe Wilensky
*Assistant Examiner* — Pradeep C Battula
(74) *Attorney, Agent, or Firm* — Welsh Flaxman & Gitler LLC

(57) ABSTRACT

Systems and methods for providing tube end forming equipment or machines that utilize the advantage of hydraulic power without having the constant noise, heat, and energy usage associated with traditional hydraulic power units. The end forming machine includes a hydraulic pump that is operated only when a demand from the system for oil pressure/flow is present. This is accomplished by providing a synchronous servo motor and servo drive coupled to a fixed displacement hydraulic pump. The oil pressure of the system is monitored to detect when the pressure drops below a preset value to provide closed-loop control of the servo motor. The servo motor is controlled to rotate the hydraulic pump at the required speed (up to the maximum RPM of the motor/pump combination) as necessary to obtain the desired system pressure during the tube end forming process.

6 Claims, 3 Drawing Sheets

(51) Int. Cl.
    *B21D 41/02*     (2006.01)
    *B21D 19/00*     (2006.01)

(56) References Cited

U.S. PATENT DOCUMENTS

| | | | | |
|---|---|---|---|---|
| 4,211,103 | A * | 7/1980 | Grimaldo | B21D 41/00 |
| | | | | 269/217 |
| 4,457,157 | A | 7/1984 | Masaki et al. | |
| 4,530,231 | A | 7/1985 | Main | |
| 5,526,669 | A | 6/1996 | Gjovik et al. | |
| 5,752,313 | A * | 5/1998 | Gaffaney | B21D 39/08 |
| | | | | 29/33 T |
| 6,260,401 | B1 * | 7/2001 | Tada | B21D 41/02 |
| | | | | 72/318 |
| 7,013,697 | B2 * | 3/2006 | Barber | B21D 41/02 |
| | | | | 72/306 |
| 7,946,147 | B2 * | 5/2011 | Shimai | B21D 41/02 |
| | | | | 72/370.01 |
| 9,085,027 | B2 * | 7/2015 | Abe | B21D 53/30 |
| 2009/0090159 | A1 | 4/2009 | Noguchi et al. | |
| 2010/0101298 | A1 * | 4/2010 | Carstensen | B21J 13/10 |
| | | | | 72/420 |
| 2011/0176940 | A1 * | 7/2011 | Ellis | F15B 3/00 |
| | | | | 417/399 |

FOREIGN PATENT DOCUMENTS

| | | |
|---|---|---|
| EP | 1053799 A2 | 11/2000 |
| EP | 1407838 A2 | 4/2004 |
| JP | 2009-090352 | 4/2009 |
| KR | 20-2007-0000395 | 4/2007 |

OTHER PUBLICATIONS

Hitchcox, Alan L. (editor), Hydraulic servopress works without valves, Hydraulics & Pneumatics, Nov. 2010.
Information regarding PSH Hydraulic Press Drive—Transforming Your Press into a Servo Press, from instruction manual, Voith Turbo H+L Hydraulic GmbH & Co. KG, Rutesheim, Germany.

* cited by examiner

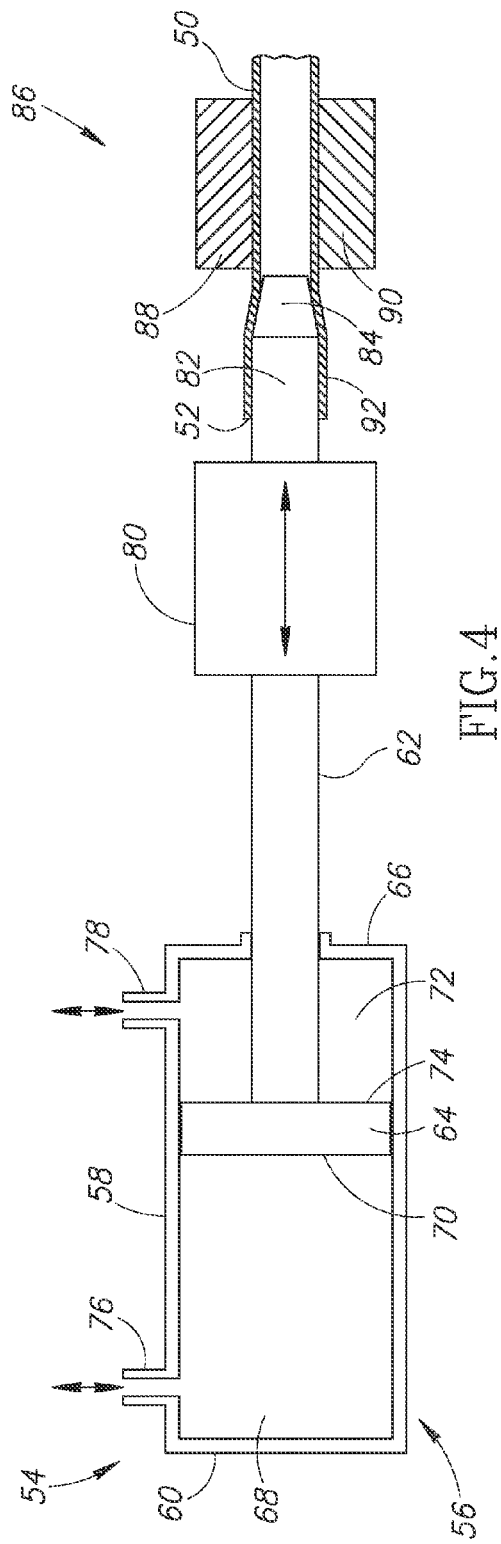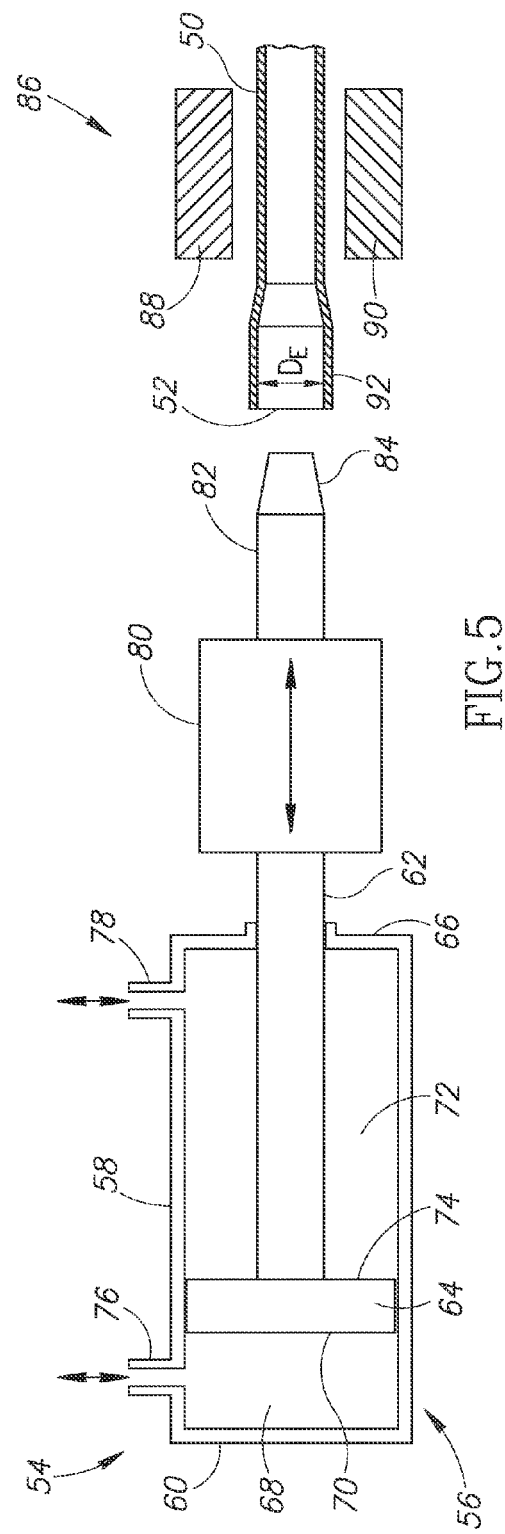

SERVO MOTOR CONTROLLED HYDRAULIC PUMP UNIT FOR TUBE END FORMING EQUIPMENT

BACKGROUND OF THE INVENTION

Field of the Invention

The present invention is directed generally to systems and methods for shaping tubing, and more specifically, to systems and methods for end forming tubes for use in systems such as vehicle exhaust systems or other systems that utilize tubes.

Description of the Related Art

Tube end forming is required for many tubing applications. Generally, tube end forms are utilized to provide some type of connection to another tube, hose, block, etc. There are several types of forms that can be applied to the end of a tube. These types include reduction, expansion, flare, bead, impact (or thickening), and the like. One popular process for end forming is referred to as "ram-type end forming." Ram-type end forming is a cold working process by which a tube to be formed is held securely in a set of clamp blocks. Forming is accomplished when one or more end forming tools (e.g., punches) positioned in alignment with the target end of the tube are "rammed" or pressed over the tube end. In addition to or as an alternative to an axial force being applied to the target end, expansion punches may be used to provide a radial force to an internal or external surface of the tube.

To facilitate the movement of the forming tools and/or clamp blocks, end forming machines typically include one or more mechanical actuators. In some machines, hydraulic cylinders are used as the actuators. Traditional hydraulic systems for end forming machines utilize an alternating current (AC) motor driving a hydraulic pump such that hydraulic pressure is constantly available to the system. The actual flow of oil to the moving parts of the machine is normally controlled using solenoid-operated valves to direct the flow of oil according to the required machine cycle. Even when the machine is not in motion and no oil pressure and/or flow is required, the AC motor continuously drives the hydraulic pump. As can be appreciated, constant noise, heat, and energy usage are all associated with end forming machines that use traditional hydraulic power units.

BRIEF DESCRIPTION OF THE SEVERAL VIEWS OF THE DRAWINGS

FIG. 4 depicts a sectional view showing a third stage of the process of forming an enlarged end on the tube wherein an expanding punch has entered the end of the tube and has expanded it to form an expanded end portion.

FIG. 5 depicts a sectional view showing a fourth stage of the process of forming an enlarged end on the tube wherein the expanding punch has been withdrawn from the tube end and the tube has been released from the clamp blocks.

DETAILED DESCRIPTION OF THE INVENTION

Embodiments of the present invention are directed to systems and methods for providing tube end forming equipment or machines that utilize the advantage of hydraulic power without having the constant noise, heat, and energy usage associated with traditional hydraulic power units. Embodiments of the present invention are designed so that a hydraulic pump unit is operated only when a demand from the system for oil pressure or flow is present. In some embodiments, this is accomplished by providing a synchronous servo motor and servo drive coupled to a hydraulic pump (e.g., a fixed or variable displacement hydraulic pump). The oil pressure of the system is monitored to detect when the pressure drops below a preset value to provide closed-loop control of the servo motor. The servo motor is controlled to rotate the hydraulic pump at the required speed (up to a maximum RPM of the motor/pump combination) as necessary to obtain the desired system pressure.

Figure 1:
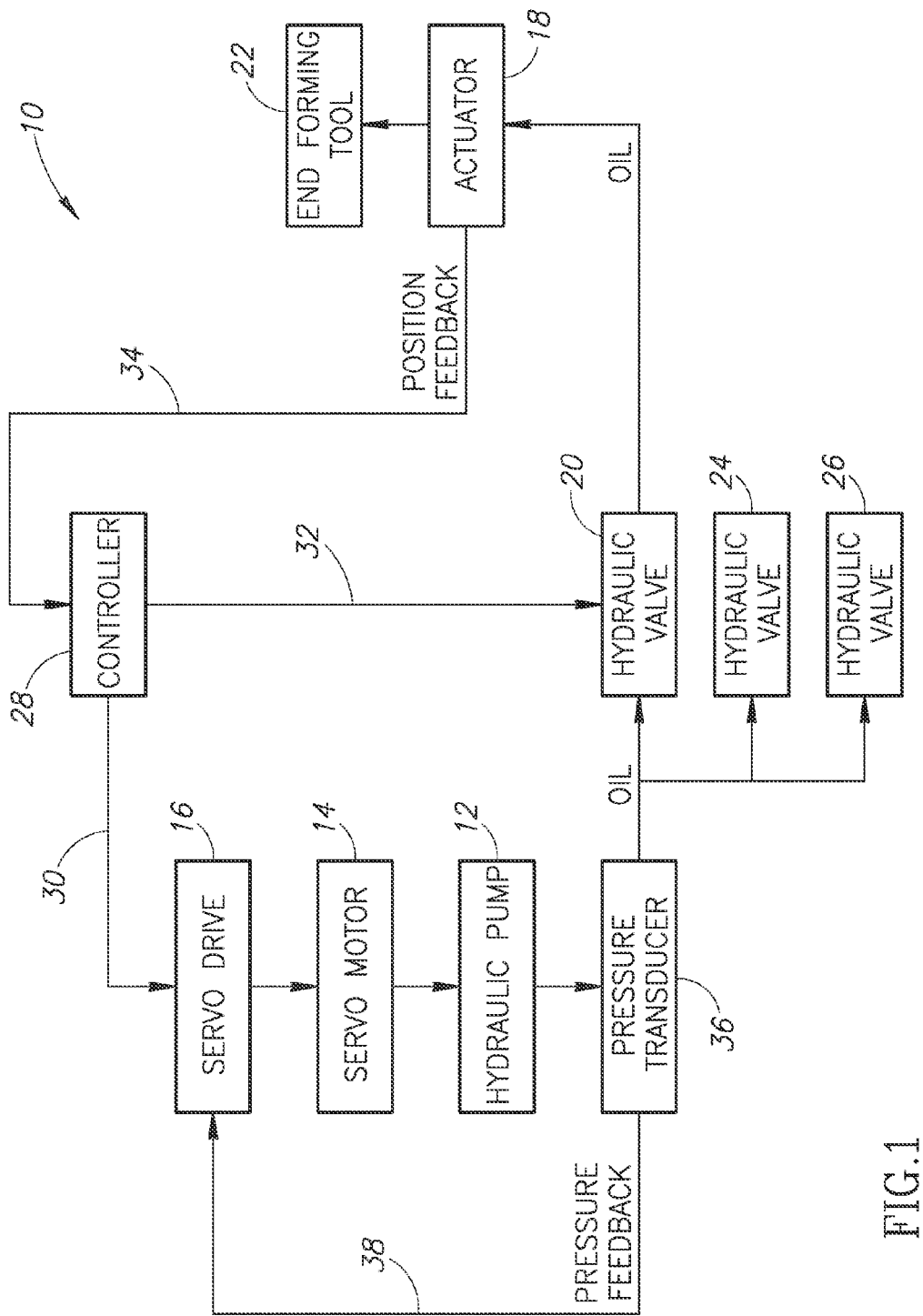
FIG. 1 depicts a block diagram of a tube end forming machine including a servo motor controlled hydraulic pump unit according to an embodiment of the present invention.

Referring to FIG. 1, an embodiment of a tube end forming machine 10 that includes hydraulic pump unit 12 controlled by a servo motor 14 (e.g., a synchronous servo motor) is shown. The end forming machine 10 includes a servo drive 16 that is operative to provide power to the servo motor 14 and to control the speed and/or torque thereof. The servo motor 14 provides rotational motion to the hydraulic pump unit 12 based on control signals received from the servo drive 16.

In some embodiments, the hydraulic pump unit 12 is a fixed displacement hydraulic pump configured to generate oil flow and/or pressure in a hydraulic circuit that comprises an actuator 18 (e.g., a hydraulic cylinder) coupled to the hydraulic pump unit 12 through a hydraulic valve 20. In other embodiments, a variable displacement hydraulic pump may be used. The variable speed and/or torque of the servo motor 14 controls the flow rate and pressure of the hydraulic circuit of the end forming machine 10. As shown in FIG. 1, the actuator 18 is operatively coupled to an end forming tool 22 and is operative to provide the physical motion (e.g., axial motion) of the end forming tool to alter the shape of an end of a tube ("tube end"). In some embodiments, additional hydraulic valves 24 and 26 may be provided that are similarly coupled the hydraulic pump unit 12 and to other actuators and end forming tools that are to be used with the end forming machine 10.

The end forming machine 10 also includes a controller 28, such as a programmable logic controller (PLC) (e.g., a digital computer), that is operative to control the sequence of operation for the end forming process and the position of the end forming tool 22 (see FIGS. 2-5). The controller 28 is further configured to optimize the hydraulic pressure and flow for the end forming process and to reduce or eliminate power usage, heat generation, and noise generation by reducing or eliminating oil flow when it is not required. In this regard, the controller 28 is operative to provide instructions to the servo drive 16 concerning system pressure requirements, and to provide control commands to the hydraulic valve 20 (and hydraulic valves 24 and 26 when used) to control the flow of oil delivered to and from the actuator 18. The controller 28 is operatively coupled to the servo drive 16 and the hydraulic valve 20 through communication lines 30 and 32, respectively. The controller 28 also receives position feedback information via a communication line 34 from the actuator 18, which allows the controller to precisely control the end forming process.

The end forming machine 10 also comprises a pressure transducer 36 (or sensor) positioned in the hydraulic circuit between the hydraulic pump unit 12 and the hydraulic valve 20. The pressure transducer 36 is configured to monitor the hydraulic pressure in the system during operation. The pressure transducer 36 is operatively coupled to the servo drive 16 through a feedback communications line 38 and is configured to provide pressure feedback information to the servo drive. Utilizing the feedback information received from the pressure transducer 38, the servo drive 16 is operative to adjust the speed and/or torque of the servo motor 14 as required to maintain the hydraulic pressure demanded by the controller 28 to control the end forming process.

Figure 2:
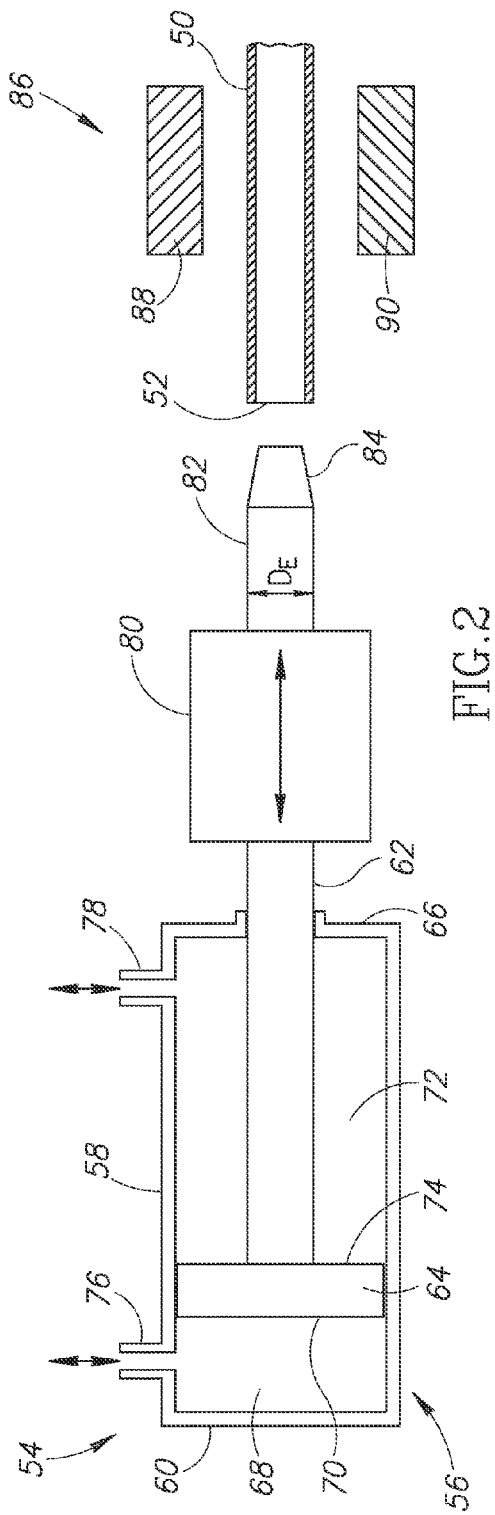
FIG. 2 depicts a sectional view showing a first stage of a process of forming an enlarged end on a tube wherein a tube is positioned between open clamp blocks.

FIGS. 2-5 illustrates various stages of a tube end forming process that may be implemented on a tube 50 using the end forming machine 10 of FIG. 1 described above to expand an end 52 of the tube. Referring first to FIG. 2, the actuator 18 takes the form of a cylinder-piston device 54 that includes a working cylinder 56 comprising a cylindrical body portion 58 having left and right end portions 60 and 66, respectively, that form a cylindrical interior volume that is divided by a piston member 64. The piston member 64 is free to move in an axial direction to the left and right as shown in FIGS. 2-5. The piston member 64 is coupled to or integrally formed with a piston rod 62, which extends axially from the piston member 64 in the direction toward the right end portion 66 of the working cylinder 56. The piston member 64 projects toward the right in FIGS. 2-5 beyond the right end portion 66 of the working cylinder 56.

The piston member 64 defines two working pressure chambers: a first pressure chamber 68 between a left end 70 of the piston member 64 and the left end portion 60 of the cylinder 56, and a second pressure chamber 72 between a right end 74 of the piston member and the right end portion 66 of the cylinder 56. Hydraulic fluid (e.g., oil) may be selectively supplied to the first pressure chamber 68 through a hydraulic fluid port or passage 76, so that when hydraulic fluid is supplied to this first pressure chamber the piston member 64 is driven to the right in FIGS. 2-5 along with the piston rod 62. Similarly, hydraulic fluid may be selectively supplied to the second pressure chamber 72 through a hydraulic fluid port or passage 78, so that when hydraulic fluid is supplied to the second pressure chamber the piston member 64 is driven to the left along with the piston rod 62. The hydraulic fluid passages 76 and 78 may be operatively coupled to a hydraulic pump and hydraulic valve, such as the hydraulic pump 12 and hydraulic valve 20 shown in FIG. 1.

In FIGS. 2-5, the end forming tool 22 of FIG. 1 takes the form of an end forming tool 80 that is selectively coupled on the right end of the piston rod 62. The end forming tool 80 includes an expanding punch 82 extending rightward (as shown) from the end forming tool in such a way that the expanding punch is coaxial with the piston rod 62. The expanding punch 82 is provided with a tapered portion 84 at its tip, and has a diameter $D_E$ that is the same as the desired enlarged inner diameter of the end 52 of the tube 50. It will be appreciated that the end forming tool 80 may include other types of punches including, but not limited to, reducing, swaging, flaring, and coping punches.

Figure 3:
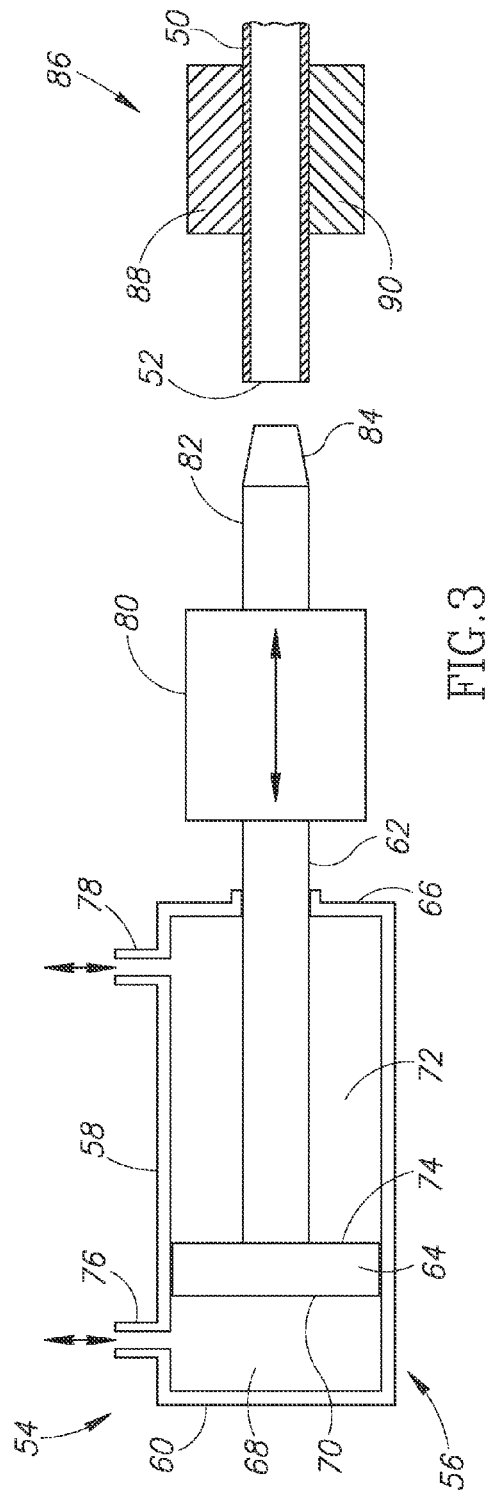
FIG. 3 depicts a sectional view showing a second stage of the process of forming an enlarged end on the tube wherein the tube is clamped securely between the clamp blocks.

As shown in FIG. 2, the piston member 64 is initially moved to the left by supplying hydraulic fluid to the second pressure chamber 72 through the hydraulic fluid passage 78. The tube 50 is positioned in a clamp device 86 between an upper clamp block 88 and a lower clamp block 90. As shown in FIG. 3, the upper clamp block 88 and the lower clamp block 90 are moved relative to each other into positions whereat the tube 50 is secured in the clamp device 86 between the clamp blocks and is axially aligned with the expanding punch 82.

Next, as shown in FIG. 4, hydraulic fluid under pressure is supplied to the first pressure chamber 68 through the hydraulic fluid passage 76, the supply of hydraulic fluid under pressure to the second pressure chamber 72 having been stopped and the fluid therein free to be exhausted through the hydraulic fluid passage 78. This action causes the piston member 64 to be driven to the right so that the expanding punch 82 enters into the end 52 of the tube 50 and expands the tube 50 as the punch moves in, so that an expanded portion 92 is formed at the end of the tube.

When the expanding punch 82 has been inserted into the end 52 of the tube 50 by a desired amount, the supply of hydraulic fluid to the first pressure chamber 68 is stopped, and hydraulic fluid under pressure is supplied to the second pressure chamber 72 with the fluid in the first pressure chamber free to be exhausted through the hydraulic fluid passage 76. Thus, as shown in FIG. 5, the piston member 64 is withdrawn to the left and the expanding punch 82 completely withdraws from the end 52 of the tube 50. As a result of this process, the tube 50 with the expanded portion 92 having an expanded diameter $D_E$ is produced.

Table 1 below compares the operating status for an end forming machine utilizing a servo motor controlled hydraulic pump unit to a traditional hydraulic end forming machine using an AC motor for four different machine conditions.

TABLE 1

| Machine Condition | Servo/Pump Status | Traditional Pump Status |
|---|---|---|
| Machine idle | Not rotating | Full RPM |
| Actuator moving at 50% velocity | 50% of max RPM | Full RPM |
| Actuator moving at 100% velocity | 100% of max RPM | Full RPM |
| Actuator holding pressure | RPM required to overcome any system losses | Full RPM |

As shown in Table 1 above, the servo motor (e.g., the servo motor 14 of FIG. 1) does not rotate when the end forming machine is in an idle condition, rotates at 50% of its maximum RPM when the actuator (e.g., a hydraulic cylinder) is moving at 50% velocity, and rotates only at the RPM required to overcome any system losses (i.e., very slow RPM) when the actuator is holding pressure and not moving. In contrast, the pump unit used in conventional end forming machines runs constantly at full RPM, regardless of the operating state of the machine.

The embodiments disclosed herein allow for enhanced machine motion control by using the variable speed of the servo motor/pump arrangement to control the oil flow rate and thus the speed of the actuator. This is in contrast to a traditional hydraulic end forming machine, wherein the oil flows at the full flow rate available from the pump as allowed by the valve port sizes and the fluid lines. To accomplish reduced motion speeds on these traditional machines, restrictions must be placed into the fluid lines in the form of flow control valves to reduce the oil flow rate and thus slow the machine motion. While this method does accomplish the desired speed control, the restrictions introduced into the fluid lines generate heat as a by-product of the fluid line restriction, resulting in higher energy consumption and higher heat generation.

Embodiments of the present invention also allow for enhanced operator safety. Since the hydraulic pump unit is not generating pressure or flow when not needed, the end forming machine naturally is in a low-energy state when the machine is idle. This can only be accomplished on a traditional system through the use of blocking valves and/or dump valves in the circuit, which undesirably cause additional heat and noise emissions.

It will be appreciated that embodiments of the present invention provide several advantages over end forming machines that utilize traditional hydraulic circuits and AC motors. Namely, the embodiments disclosed herein use less energy due to the significantly reduced duty cycle on the hydraulic pump unit, and require less hydraulic system maintenance, both of which reduce operating costs. The embodiments presented herein also produce less heat; generate less noise emissions; require a smaller hydraulic reservoir and thus require less oil to operate; have the ability to control the speed of machine motions without additional components in the hydraulic circuit; and achieve a safe, low-energy state when the machine is idle without requiring additional components in the hydraulic circuit that may increase cost as well as heat and noise emissions.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. An apparatus for altering the shape of an end of a tube using an end forming tool, the apparatus comprising:
    a hydraulic actuator operatively couplable to the end forming tool and configured to move the end forming tool into contact with the end of the tube to alter the shape thereof;
    a hydraulic pump operatively coupled to the hydraulic actuator through a hydraulic circuit comprising hydraulic fluid, the hydraulic pump being configured to generate flow and pressure of the hydraulic fluid in the hydraulic circuit to drive the hydraulic actuator;
    a servo motor operatively coupled to the hydraulic pump and configured to drive the hydraulic pump;
    a servo drive coupled to the servo motor and operative to control the speed or torque of the servo motor which in turn controls the flow rate or pressure of the hydraulic fluid in the hydraulic circuit;
    a pressure transducer operatively coupled to the hydraulic circuit and the servo drive, the pressure transducer being configured to monitor the hydraulic pressure of the hydraulic circuit and to provide pressure feedback information to the servo drive that is used by the servo drive to control the speed or torque of the servo motor; and
    a controller operatively coupled to the servo drive and the hydraulic actuator, the controller being configured to control the position and movement of the end forming tool by receiving position feedback information from the hydraulic actuator and sending control commands to the servo drive indicative of system pressure;
    wherein the hydraulic pump is a fixed displacement hydraulic pump.

2. The apparatus of claim 1, wherein the servo motor is a synchronous servo motor.

3. The apparatus of claim 1, further comprising a hydraulic valve positioned in the hydraulic circuit between the hydraulic pump and the hydraulic actuator, the hydraulic valve being operative to control the direction of flow of the hydraulic fluid through the hydraulic circuit.

4. The apparatus of claim 1, further comprising a plurality of hydraulic actuators, and a plurality of hydraulic valves each positioned in the hydraulic circuit between the hydraulic pump and a corresponding one of the plurality of hydraulic actuators, each of the hydraulic valves being configured to control the flow of hydraulic fluid to and from the hydraulic valve corresponding to one of the hydraulic actuators.

5. The apparatus of claim 1, wherein the hydraulic actuator comprises a hydraulic cylinder-piston device comprising a working cylinder, a piston member, and a piston rod coupled to the piston member, the piston rod being removably couplable to the end forming tool.

6. An apparatus for altering the shape of an end of a tube using an end forming tool, the apparatus comprising:

a hydraulic cylinder-piston device operatively couplable to the end forming tool and configured to move the end forming tool into contact with the end of the tube to alter the shape thereof;

a fixed displacement hydraulic pump operatively coupled to the hydraulic cylinder-piston device through a hydraulic circuit comprising hydraulic fluid, the fixed displacement hydraulic pump being configured to generate flow and pressure of the hydraulic fluid in the hydraulic circuit to drive the hydraulic cylinder-piston device;

a synchronous servo motor operatively coupled to the fixed displacement hydraulic pump and configured to drive the fixed displacement hydraulic pump;

a servo drive coupled to the synchronous servo motor and operative to control the speed or torque of the synchronous servo motor which in turn controls the flow rate or pressure of the hydraulic fluid in the hydraulic circuit;

a pressure transducer operatively coupled to the hydraulic circuit and the servo drive, the pressure transducer being configured to monitor the hydraulic pressure of the hydraulic circuit and to provide pressure feedback information to the servo drive that is used by the servo drive to control the speed or torque of the synchronous servo motor;

a hydraulic valve positioned in the hydraulic circuit between the fixed displacement hydraulic pump and the hydraulic cylinder-piston device, the hydraulic valve being operative to control the direction of flow of the hydraulic fluid through the hydraulic circuit; and a digital computer operatively coupled to the servo drive, the hydraulic valve, and the hydraulic cylinder-piston device, the digital computer being configured to control the position and movement of the end forming tool by receiving position feedback information from the hydraulic cylinder-piston device, sending control commands to the servo drive indicative of system pressure, and sending control commands to the hydraulic valve to control the direction of flow of the hydraulic fluid through the hydraulic circuit.

* * * * *